US012522002B2

(12) United States Patent
Barbet et al.

(10) Patent No.: US 12,522,002 B2
(45) Date of Patent: Jan. 13, 2026

(54) ARRANGEMENTS AND METHODS FOR DRYING PRINTED INK

(71) Applicant: Dover Europe Sàrl, Vernier (CH)

(72) Inventors: Bruno Barbet, Etoile sur Rhône (FR); Amine Bendaoud, Saint Etienne (FR)

(73) Assignee: Dover Europe Sárl, Vernier (CH)

( * ) Notice: Subject to any disclaimer, the term of this patent is extended or adjusted under 35 U.S.C. 154(b) by 163 days.

(21) Appl. No.: 18/074,184

(22) Filed: Dec. 2, 2022

(65) Prior Publication Data

US 2023/0182489 A1 Jun. 15, 2023

(30) Foreign Application Priority Data

Dec. 3, 2021 (EP) .................................... 21212353

(51) Int. Cl.
*B41J 11/00* (2006.01)

(52) U.S. Cl.
CPC ............................... *B41J 11/00222* (2021.01)

(58) Field of Classification Search
CPC ............ B41J 11/00222; B41J 11/00224; B41J 11/0022; B41J 2/02; B41J 11/0024; F26B 13/00; F26B 21/004
USPC .......................................................... 347/102
See application file for complete search history.

(56) References Cited

U.S. PATENT DOCUMENTS 6,390,618 B1 * 5/2002 Wotton .............. B41J 11/00216 347/102
6,463,674 B1 * 10/2002 Meyers ................. F26B 21/086 34/304
8,011,779 B2 9/2011 Matsuhashi
8,840,105 B1 9/2014 Priebe
2003/0226276 A1 * 12/2003 Yonkoski ............. F26B 21/004 34/621
2004/0100512 A1 * 5/2004 Codos .................. B41M 7/0081 347/8
2009/0021549 A1 1/2009 Muto
2009/0272321 A1 11/2009 Tateishi
2010/0188464 A1 * 7/2010 Peleg .................. B41M 7/0027 347/54
2012/0249703 A1 * 10/2012 Nishimura ........... B41J 11/0022 347/102

(Continued)

FOREIGN PATENT DOCUMENTS

KR 2007-0006971 A 1/2007

OTHER PUBLICATIONS

European Search Report from corresponding European Application No. 21212353.3, dated May 23, 2022, 9 pages.

*Primary Examiner* — Jason S Uhlenhake
*Assistant Examiner* — Alexander D Shenderov
(74) *Attorney, Agent, or Firm* — Tucker Ellis LLP

(57) ABSTRACT

An arrangement in communication with a printer. The printer includes at least a print-head configured to deposit liquid ink on an area on a surface of a substrate. The liquid ink comprises a solvent portion and a dry content. The arrangement comprises at least one nozzle configured to generate a stream of gas over said area with a gas stream velocity and/or gas stream shape, such that an evaporation rate of the solvent portion of the liquid ink is increased and a rate of change of velocity of the gas stream propagation increases with a distance normal to a direction of a gas flow and is maximized over the surface of the substrate and the deposited ink.

18 Claims, 8 Drawing Sheets

(56) References Cited

U.S. PATENT DOCUMENTS

| | | | | |
|---|---|---|---|---|
| 2019/0100034 | A1* | 4/2019 | Yoda | B41J 11/00216 |
| 2021/0309019 | A1 | 10/2021 | Wahl | |

* cited by examiner

ARRANGEMENTS AND METHODS FOR DRYING PRINTED INK

RELATED APPLICATION DATA

This application claims priority to European Patent Application No. 21212353.3, filed Dec. 3, 2021, the disclosure of which is incorporated herein by reference in its entirety.

TECHNICAL FIELD

The present invention relates to methods and arrangements for drying an ink deposition on a substrate in general and expediting evaporation of solvents in the ink deposition in particular, and especially in high-speed inkjet printers.

BACKGROUND

Different consumable products surround us, and those products are encased in packaging. The product packaging is an essential part of any commodity as it provides information about the product. No matter food or cosmetic products, the details regarding the manufacturing, expiry and batch number are printed on the packaging. These details are necessary for the consumer. Apart from the information, clear and high-quality printing adds to the overall look of the finished product. It's a part of the brand and builds the reputation of the product. Consequently, improved packaging material and faultless printing technology is used to prepare the finished product.

Inkjet printers, for example, are used vastly in printing industry as they have a number of advantages: they are quieter in operation, they can print finer, smoother details through higher resolution, consumer inkjet printers with photographic-quality printing are widely available, in comparison to technologies like thermal wax, dye sublimation, and laser printing, inkjets have the advantage of practically no warm-up time, and often lower cost.

Some types of industrial inkjet printers, such as inkjet printers with ink drop volume of 200 to 2000 pl (10 to 10 000 pl) and Continuous Inkjet (CIJ) are capable of printing at very high speeds, in wide formats, or for a variety of industrial applications ranging from signage, textiles, ceramics, metals, etc.

Jetting liquid ink produces ink spots on the media, ultimately leaving ink dry residues consisting of binder, resin, dye, pigment, etc. The solvent flows away due to an evaporation mechanism meaning that the solvent is changing its thermodynamic state from liquid to gas. In some production lines, the product is packaged, stacked and/or winded after marking. Thus, the process of drying must be quick to fix the printed pattern on the substrate. This short time window is a challenge to evaporate away the solvent from the printed spots/dots. Consequently, there is a need to increase the speed of the drying process.

Currently the ink and printer producers utilize high volatile solvents in the ink composition, which may pose an issue in view of safety and regulations. Known examples are solvents such as Methyl Ethyl Ketone (MEK or butanone), methanol or Methyl Isopropyl Ketone (MIPK or 3-Methyl-2-butanone). On the other hand, alcohol, such as ethanol, and water are also solvents known to be used in ink compositions, but their applications are limited due to challenge linked to low evaporation rates.

The problem of low evaporation rate is quite common in the field of, e.g., Digital Press Printing (textile, paper, etc.). To speed-up drying time, various solutions have been implemented based on pump, electrical heater and high intensity light sources (such as infrared). These solutions are oversized and not suitable for coding and marking inkjet printing with smaller printheads and/or installation space, such as CIJ. Moreover, drying time exposure for the above solutions is still too long for making them suitable for coding and marking inkjet printing.

CIJ printers using liquid inks are facing drying time constraints. This performance is usually addressed by elaborating with volatile solvents, such as methanol and ketones (e.g. MEK). These solvents becoming more problematic as they require trade licenses and authorizations to comply with regulations. Hence, there is a need to provide inks with alternative solvents.

SUMMARY

The present invention solves the above-mentioned problems, especially in applications involving high speed inkjet printers. According to exemplary embodiments, problems are solved by increasing speed of drying process, e.g. using a small size dryer mechanism comprising an efficient gas stream.

Moreover, the present invention allows use of low volatile solvents, e.g., water, which is one of most difficult solvents to be dried. As one result, the present invention may facilitate the use of alternative solvents for high-speed inkjet printers' (such as CIJ) inks, which are not subject to trade licenses or authorizations requirement and do not pose any safety and health issues.

According to some embodiments, to speed up the evaporation process it is proposed using a heated gas stream on or over the printed pattern.

In, for example, Drop on Demand inkjet printer or similar technologies, the print speed is normally low so there is time available to dry ink deposition. Consequently, the present invention provides a solution optimized for high-speed moving media, i.e., a substrate exposed to the drying device only a short period of time. Moreover, the invention is easy from a mechanical integration standpoint. Especially, some exemplary embodiments, in production lines including high speed CIJ printers, wherein small size print heads offer flexibility in term of integration within production line, the downsizing of the dryer is a challenge to obtain dimension/footprint consistent with print head size. CIJ print are highly used in marking/coding of individual products moving at high-speed, meaning duration/time available to apply drying is very small (before the product is quickly packed). Thus, the present invention is suitable for use in industrial inkjet printers, such as inkjet printers with ink drop volume of 200 pl to 2000 pl (picoliter) (10 to 10 000 pl) and CIJs capable of printing at very high speeds, in wide formats, or for a variety of industrial applications ranging from signage, textiles, ceramics, metals, etc.

This also implies that the invention is suitable in printing applications in which media/substrate moves at high velocity and is quickly displaced away from the printhead. Because of the dryer device of the invention, drying time may be reduced to be comparable to high volatile solvent-based inks, such as MEK based inks. Consequently, the need of decreasing production line speed and/or refurbishing the production lines is reduced or ceases.

For these reasons a dryer arrangement is configured to be arranged down steam of a liquid ink depositing printhead and to speed up drying time for a liquid ink deposited on an area on a surface of a substrate. The arrangement comprises: at least one nozzle portion comprising a nozzle configured to generate and direct a laminar stream of gas with a gas stream velocity and/or gas stream shape over said area, wherein the gas stream exhausting from the nozzle exhibits a front edge and a difference in velocity between adjacent layers of the gas, and a rate of change of the gas stream velocity of propagation increases with distance normal to the direction of the flow such that an evaporation rate of a solvent portion of the liquid ink is increased and a rate of change of velocity of the gas stream propagation increases with a distance normal to a direction of a gas flow and is maximized over the surface of the substrate and the deposited ink. In one embodiment, the gas stream velocity and/or shape is generated with respect to characteristics of the liquid ink. According to one embodiment, the nozzle comprises an exhaust portion to shape the gas stream to a gas-blade. In one embodiment, the gas stream has one or several characteristics, which may include: a stream thickness between 50 μm to 500 μm, preferably between 100 μm to 500 μm; a stream velocity between 10 m/s to 150 m/s, preferably between 80 m/s to 100 m/s; a temperature between 0° C. and 150° C. and preferably in range of 100° C. According to one embodiment, the gas stream is generated in a same direction as a substrate displacement direction. The arrangement of the invention may further comprise one or several of: a gas stream amplifier device in communication with the nozzle, and wherein the gas stream is issued from the gas amplifier, which can minimize size of tubing supplying gas; and a gas inlet connected to one or several of a printer housing or an external source. The amplification factor can be between 10 up to 50, which manages pressure drop i.e., to alleviate pumps workload. In one embodiment, the arrangement may further comprise a device configured to mechanically control a direction of the gas stream at nozzle exhaust. This minimizes divergence of the gas stream thickness and allows imping the substrate smoothly. In the arrangement according to one embodiment, the nozzle is configured to have one or several characteristics, such as: being inclined in an angle range of 70° to 80° with respect to a perpendicular axis of the substrate plane; comprising a device for generating Coanda effect for bending the gas stream; comprising a guiding surface for directing the gas stream. In one embodiment, the arrangement may further comprise one or several of: a detection device configured to detect one or several of the substrate, a substrate type, a substrate surface type, a substrate speed; a unit to receive printer configurations to adopt gas stream; a heating element; a controller configured to execute one or several of: controlling the pump; controlling the heating element; adjusting a response time of the heating element with respect to a speed of the substrate; controlling one or several gas stream parameters and tune to each solvent to match a liquid ink drying time. According to one embodiment, the gas is air. According to one embodiment, the printer is a Continuous Inkjet (CIJ) printer device. In one embodiment, the liquid ink contains a solvent or solvent mixture that has a low vapor pressure in a range of 1 mbar to 100 mbar at 25° C. According to one embodiment, the arrangement further comprises a purification device for purifying gas from the gas source in order to minimize the solvent quantity in the gas.

The invention also relates to a printer comprising a print head configured to deposit ink drops onto a substrate and a print controller. The printer comprises a dryer arrangement arranged downstream from the print head, as described previously.

The invention also relates to a method of evaporating a solvent portion of a liquid ink deposited on an area on a surface of a substrate. The method comprises generating by a nozzle a laminar stream of gas over the area with a predetermined stream velocity and/or shape, such that the gas stream exhibits a front edge and a difference in velocity between adjacent layers of the gas, and a rate of change of the gas stream velocity of propagation increases with distance normal to the direction of the flow, such that an evaporation rate of the solvent portion of the liquid ink is increased and a gas velocity gradient is maximized over the surface of the substrate and the deposited ink.

BRIEF DESCRIPTION OF THE DRAWINGS

The following detailed description refers to the accompanying drawings. It should be noted that the same reference numbers in different drawings may identify the same or similar elements.

DETAILED DESCRIPTION

The following detailed description does not limit the invention. Instead, the scope of the invention is defined by the appended claims and equivalents.

The term "gas" as used herein may refer to a gaseous medium that is a substance that is neither solid nor liquid.

The term "gas blade" as used herein, may refer to a gas stream having a front edge and a difference in velocity between adjacent layers of the gas, wherein the rate of change of the velocity of propagation increases with distance normal to the direction of the flow.

Figure 1:
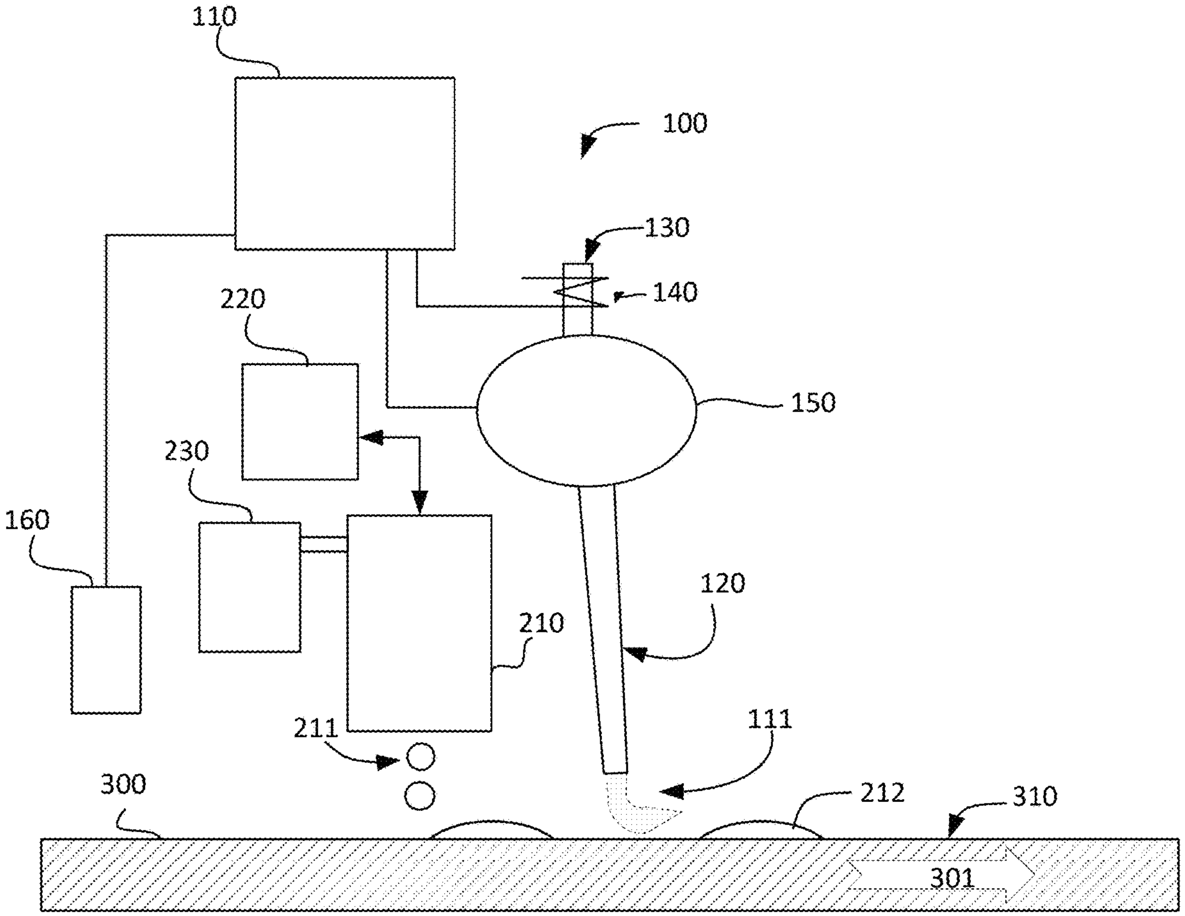
FIG. 1 is a diagram of an exemplary inkjet printer system in which methods and systems described herein may be implemented.

FIG. 1 illustrates a very schematically and in an exaggerated view an ink printer portion. The printer portion comprises a print head 210, a controller 220 and an ink reservoir 230. The printer portion further comprises a dryer system 100 according to one aspect of the present invention. The dryer system according to this example comprises a controller 110, a nozzle 120, a pump 150, a heating element 140, a gas inlet 130 and a detector 160.

The gas may comprise air or any suitable (inert) gas such as Nitrogen, for instance. The pump 150 is given as an example and any type of arrangement for generating a gas flow may also be used, such as compressed air, etc.

The heating element 140 and a detector 160 may be optional and depend on application areas. The controller 110 may be a part of or same as the controller 220.

In operation, the print head 210 is configured to receive print signals from the controller 220 and deposit ink drops

211 onto a surface 310 of a substrate or an information carrier 300. The ink is provided to the print head 210 from the reservoir 230.

The substrate 300 may be any type of material, such as paper, cardboard, metal, glass, plastic, etc. and moves in a direction 301 away from the print head in a predetermined speed. The ink drops 212 are deposited or jetted from the print head onto the surface 310 of the substrate and depending on the material type may be (partially) absorbed or dried.

The dryer system 100 according to the present invention is used to speed up the drying process of the deposited drops 212 on the surface 310. The system's primary function is to generate a gas stream 111 over the surface and the deposited drops 212. The gas stream 111 is shaped as a so-called air or gas blade (described in more detail below) having a thickness of some hundreds of microns to maximize the gas velocity gradient on the substrate. The gas stream velocity may be in the range of e.g., 10 m/s to 150 m/s, preferably 80 m/s. The direction of the gas stream 111 is the same as the substrate displacement 301 direction. To achieve this, the injector or nozzle 120 is located downstream the print head 210 to prevent the gas impingement of droplets in flight. The distance between the print head and the nozzle head may be from 1 cm to 10 cm, preferably 2-3 cm.

The nozzle head (illustrated in a side view) may have a width extending substantially at least over the entire width of the substrate.

Figure 2:
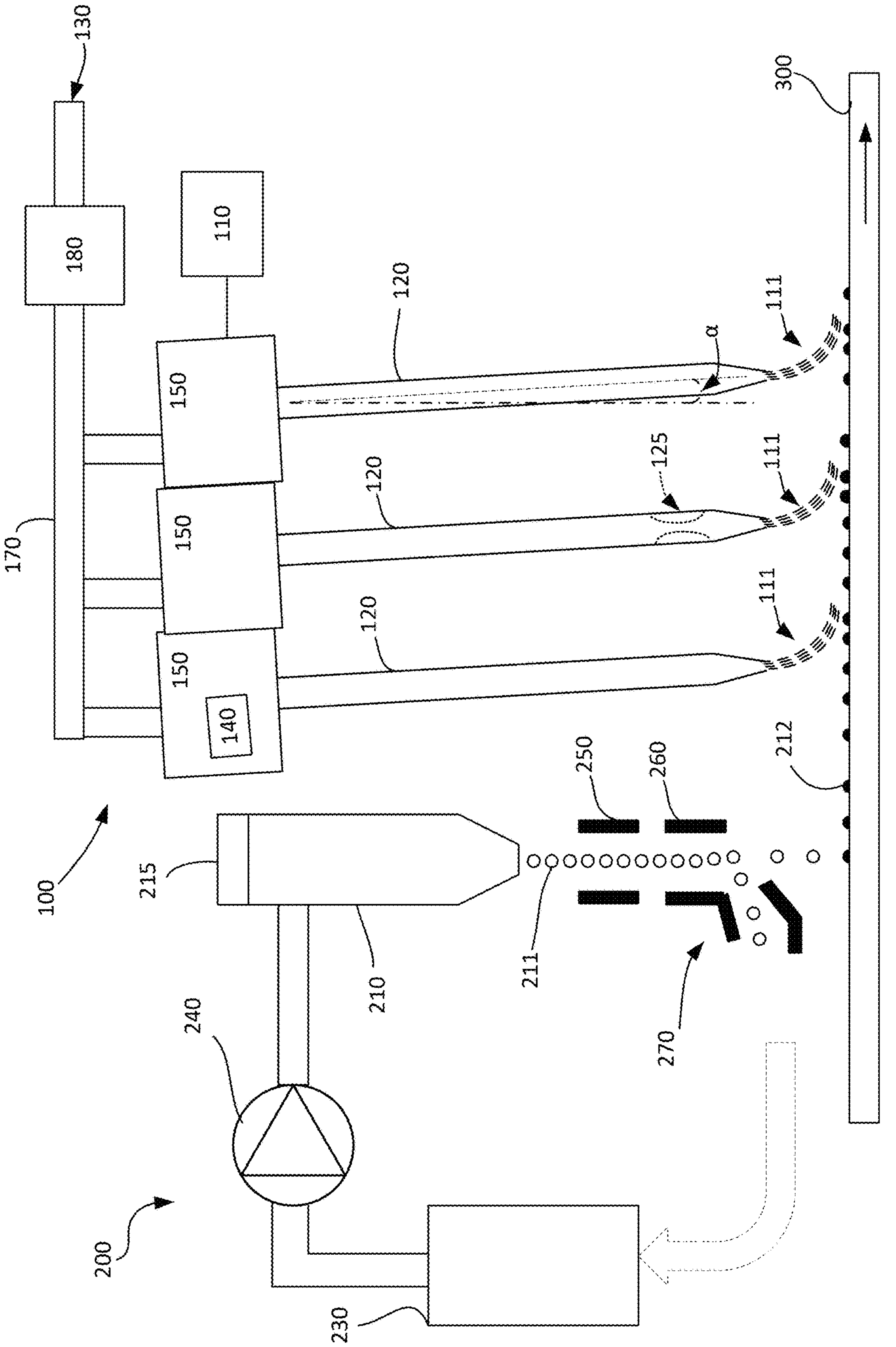
FIG. 2 is a diagram of an exemplary continuous inkjet printer system in which methods and systems described herein may be implemented.

FIG. 2 illustrates very schematically an exemplary portion of another printer device, in this case a portion of an exemplary Continuous Inkjet printer.

The printer portion 200 according to this example comprises: a nozzle 210, a piezoelectric transducer 215, an ink pump 240, an ink reservoir 230, a charging plate 250, deflection electrode 260, and a gutter 270. The collected ink from the gutter 270 may be transported to the reservoir 230 through a filter (not shown).

In operation, the high-pressure pump 240 drives liquid ink from the reservoir 230 into the substantially microscopic nozzle 210, creating a stream of droplets 211. The droplets 211 are given an electric charge by means of the charging plate 250, which can vary from drop to drop.

The stream of drops 211 is basically aimed at the gutter 270, which catches and exceeded ink, however alongside the direction of the travel are one or more electrostatic deflection plates 260. Changing the charge on the plate 260 changes the travel direction of the droplets, and since each droplet has its own charge, the result is that they are individually aimed either at a target (substrate) or into the gutter. The charge and deflection plates may be connected to a print controller (not shown). The position of the gutter in this example is due to limits in the drawing and in another embodiment, the gutter may be arranged in the opposite side depending on whether CIJ is multi-deflected technology (charged droplets are printed) or binary technology (uncharged droplets are printed. See FIG. 1)

A piezoelectric crystal 215 vibrating at regular intervals may be used to make droplets more regular. The aim of droplets can be improved by separating charged droplets with uncharged guard droplets which are caught in the gutter.

The droplets may be generated at a frequency of 50 kHz to 200 kHz, which allows a high maximum print speed. The pressure pump 240 may set the distance travelled and how small the ink spreads and the drops may typically travel at 20 m/s.

Consequently, the CIJ can use many varieties of inks and thus solvents. In most printers, the ink is conductive but it can carry coloured pigments and ketone or alcohol carriers so the ink can dry quickly and be very long lasting. CIJ is widely used for marking and coding products on production lines, and especially printing on objects with irregular surfaces.

The dryer system portion 100, according to this example, comprises three dryers in row downstream the print head, each comprising a nozzle 120 and a pump 150, controller 110, inlet 130, optional gas filter 180 and gas feeding tube 170. A heating element 140 may be arranged in one or all dryers, e.g., in communication with the pump 150, the nozzle 120 or feeding tubes. A heated gas may also be fed from an external source.

The number of dryers (nozzles) or use of them (in case of multiple nozzles) may depend on, e.g. print assignment and type, substrate type, and/or ink solvent. One or several dryers may be used depending on, for example, if the solvent is alcohol based or water based. In high-speed assignments more than one nozzle may be used to speed up the drying process.

Each nozzle 120 may be provided with an amplifier or amplification arrangement 125, e.g., comprising a narrowing of the nozzle pipe or nozzle head, which generates a gas flow amplification. The amplification may also be achieved at the nozzle head using so called Coanda effect. In operation, the gas in motion is issued from the amplifier 125 to minimize size of the tubing supplying gas from the source. An amplification factor between 10 up to 50 may be utilized to manage gas pressure drop, i.e., to alleviate pumps workload.

Each nozzle's head generates a gas stream 111, which can be directed using different techniques, which will be described in more detail below. The gas stream generates a gas blade flowing over the substrate's 300 surface 310 and deposited ink drops 212.

The gas blade direction may be bended using, e.g., Coanda deflectors to minimize divergence of gas blade thickness and to have the gas flow smoothly landing on the substrate. As the gas flow and the substrate movement are almost parallel, the evaporation mechanism is reinforced over a longer distance.

In one embodiment, e.g., depending on the type of solvent, a heated gas may be used. The gas may be heated using heating element 140 in communication with the pump 150 and/or nozzle 120 to reach a temperature of 0° C. to 200° C., preferably between 50° C. and 150° C., and most preferably 100° C., as function of the targeted performance.

A detector may be used to detect the substrates movement, which trigs the on/off switching of the gas flow, e.g., to save energy. In one embodiment, the heater response time may be adjusted consistently with the moving time of the substrate to be printed to not waste energy during rest period.

In one exemplary embodiment, the gas flow parameters may be controlled and tuned for each solvent, e.g., to match MEK drying time, and consequently not to introduce print line modifications. For example, a look-up table may be utilized by the controller managing the dryers. The table may contain ink type, solvent type, drying time, etc. The term look-up table as used herein relates to a structured data storage, which based on one or several input data provides one or several data parameters, which may be used to control some functionalities of the drying mechanism.

In one exemplary embodiment, the gas flow parameters may be set by an operator or user of the printer by entering information such as ink type (name, Id), substrate, environmental parameters (humidity, temperature) or detected by a detector, e.g. by scanning and reading the ink cartridge id (serial number) or detecting using RFID on cartridge, and/or using environmental sensors, etc.

The gas flow direction from each nozzle head towards the surface of the substrate is substantially 90° or may have an angle down to 45° with respect to substrate surface moving direction (counterclockwise orientation). Each nozzle may be tilted in an angle $\alpha$, e.g., 80° to 70°, with respect to a perpendicular plane to the substrate surface. This will also minimize divergence of gas blade and to direct gas flow gently landing on the substrate. Also tilted nozzles are illustrated in the described embodiments, perpendicular nozzles may be used with gas stream directing arrangements. In some exemplary embodiments, the substrate may be tilted with respect to the nozzle head. In yet other exemplary embodiments, the nozzle may be perpendicular to the substrate with or without stream directing arrangements.

To achieve efficient solvent evaporation, one key feature is the thickness of the gas stream boundary layer at the surface of the substrate, i.e., the gas velocity gradient. The so called “gas blade” voids solvent vapor having a velocity in the range of 10 m/s to 150 m/s, preferably in a range between 80 m/s-100 m/s impinges the surface of the substrate downstream printed pattern. The type, variety or the nature of the utilized gas is not limited but air may be preferred for the sake of ease of implementation. The gas from the gas source may be purified, e.g. using a filter 180, to minimize solvent quantity, especially of air dealing with, e.g., water-based solvents at below 50% vapor pressure of ambient air ideally below 5%. The gas blade thickness may typically be 100 μm to maximize velocity for a given flow rate. Thickness ranges between 50 μm up to 5000 μm may also be considered, according to velocity of given gas flow rate.

In some cases, the liquid ink may contain a solvent or solvent mixture in which the solvent portion has a low vapor pressure in a range of 1 mbar to 100 mbar, e.g. at 25° C. temperature.

Consequently, in one embodiment, the evaporation speed of ink’s solvent may be increased in order to allow higher print speed. In another embodiment, solvents less volatile than MEK such as MIPK, Isopropanol and water can be used, as mentioned earlier, having a low vapor pressure, e.g. in a range of 1 mbar to 100 mbar.

However, it should be noted that despite a higher vapor pressure, for example ethanol drying time may be longer than MIPK. Accordingly, under specific conditions, some grams of the solvent evaporate during the same time as 1 gram of butyl acetate. Evaporation rates relative butyl acetate are approximately: MEK 4.8/MIPK 4/Ethanol 2.

Consequently, according to an exemplary embodiment, the fast-drying system of the present invention is suitable for inks comprising solvents with an evaporation rate lower than MEKs evaporation rate (and vapor pressure).

Table 1 shows some exemplary vapor pressures at 25° C. for different solvents.

TABLE 1

| Solvent | Vapor Pressure |
|---|---|
| MEK | 121 mbar |
| Ethanol | 80 mbar |
| MIPK | 70 mbar |
| Isopropanol | 60 mbar |
| Water | 32 mbar |

These can be compared to fast drying solvents such as Aceton and Methanol, which have a vapor pressure at 308 mbar and 169 mbar, respectively.

Figure 3:
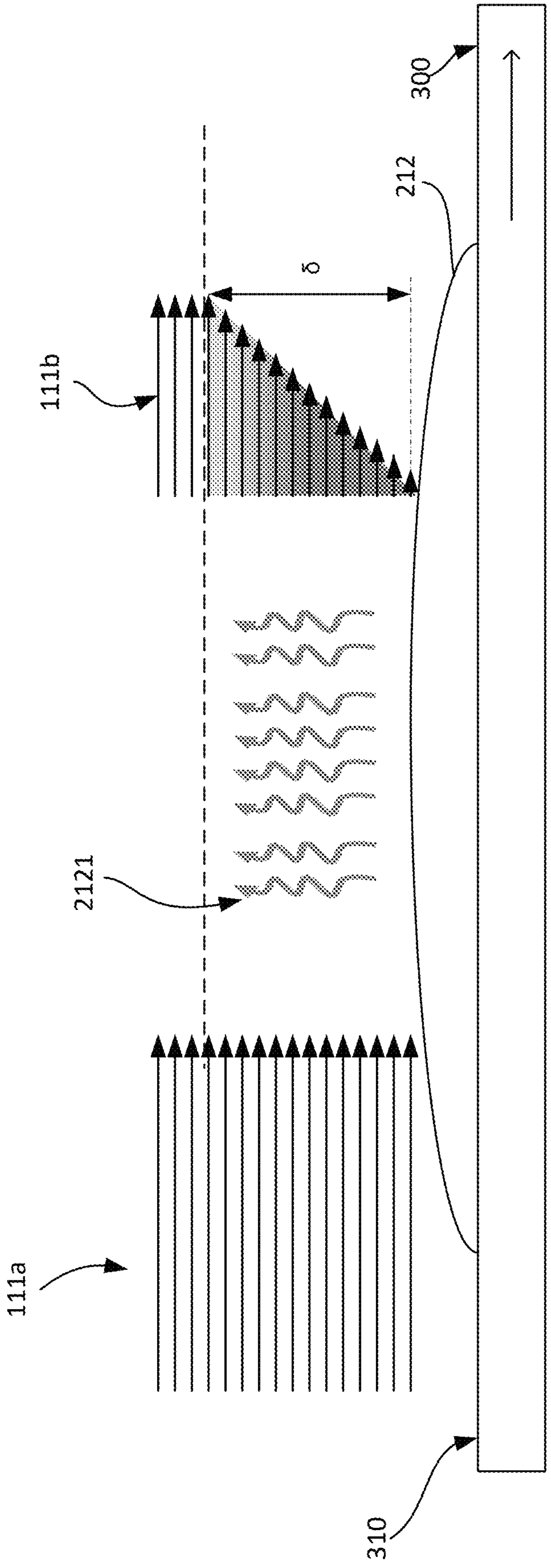
FIG. 3 illustrates schematically the gas stream mechanics over a substrate and deposited ink drop in accordance with the present invention.

FIG. 3 illustrates the basics of the invention. When the gas 111*a* is moving over a surface 310, the layer of the gas in contact with or adjacent to the surface 310 of the substrate and the deposited ink 212 tends to be in the same state of motion as the substrate/ink (hereinafter object) with which it is substantially in contact with; i.e., the layer of the gas along the substrates surface and also the deposited ink is carried along at the same velocity as the object. If the difference in velocity between the gas in contact with the moving object and the gas above the object is not too great, then the gas flows in continuous, smooth layers; that is, the flow is laminar. The result is evident via the stream 111*b*. The arrow on the substrate 300 indicates the direction of the object.

Thus, the rate of the solvent evaporation 2121 is controlled by tailoring the thickness of the gas boundary layer $\delta$. This can be minimized for maximizing the gradient of the solvent vapor concentration by controlling the gas injection velocity and/or shape for given solvent property.

Additionally, generating the gas stream with controlled shape and/or velocity in close contact with the substrate surface and deposited ink patterns can void solvent vapor.

Figure 4B:
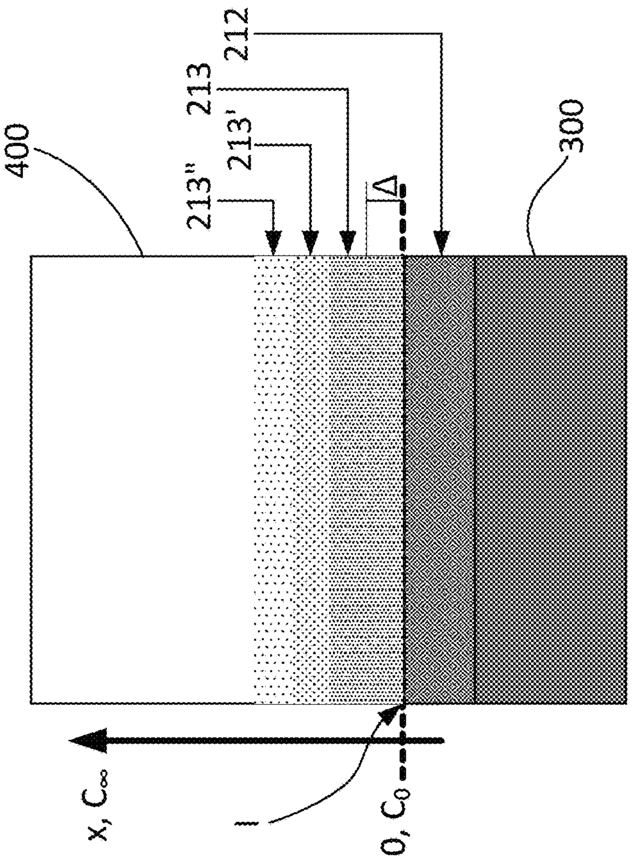
FIGS. 4A and 4B illustrate very schematically a solvent evaporation mechanism.
Figure 4A:
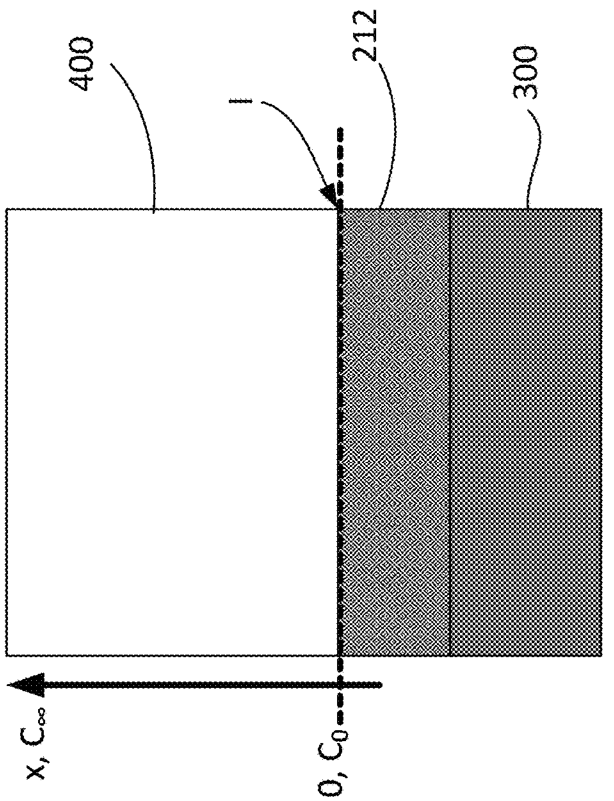

The theory behind the solvent evaporation is summarized in the following:

FIGS. 4A and 4B illustrate very schematically solvent evaporation mechanism.

In FIG. 4A, the liquid ink 212 is deposited on the substrate 300 at $t_0=0$. 400 designates the ambient air (or a gas). The liquid interface between the surface of the ink 212 and the ambient air 400 is denoted with “I”. The concentration at the liquid interface is constant Co. The solvent concentration is zero ($C_\infty=0$) a distance from the interface.

The solvent evaporation mechanism consists in solvent migration/diffusion from the liquid phase (i.e., concentration Co) towards the ambient air (concentration $C_\infty=0$). The diffusion occurs within a thickness “x”.

In FIG. 4B (t0>0) the diffusion has started. The vaporization of the solvent of ink 212 is represented by layers 213, 213' and 213" (represented by decreasing dot density). It is notable that the interface I is dropped Δ compared to FIG. 4A.

Figure 5:
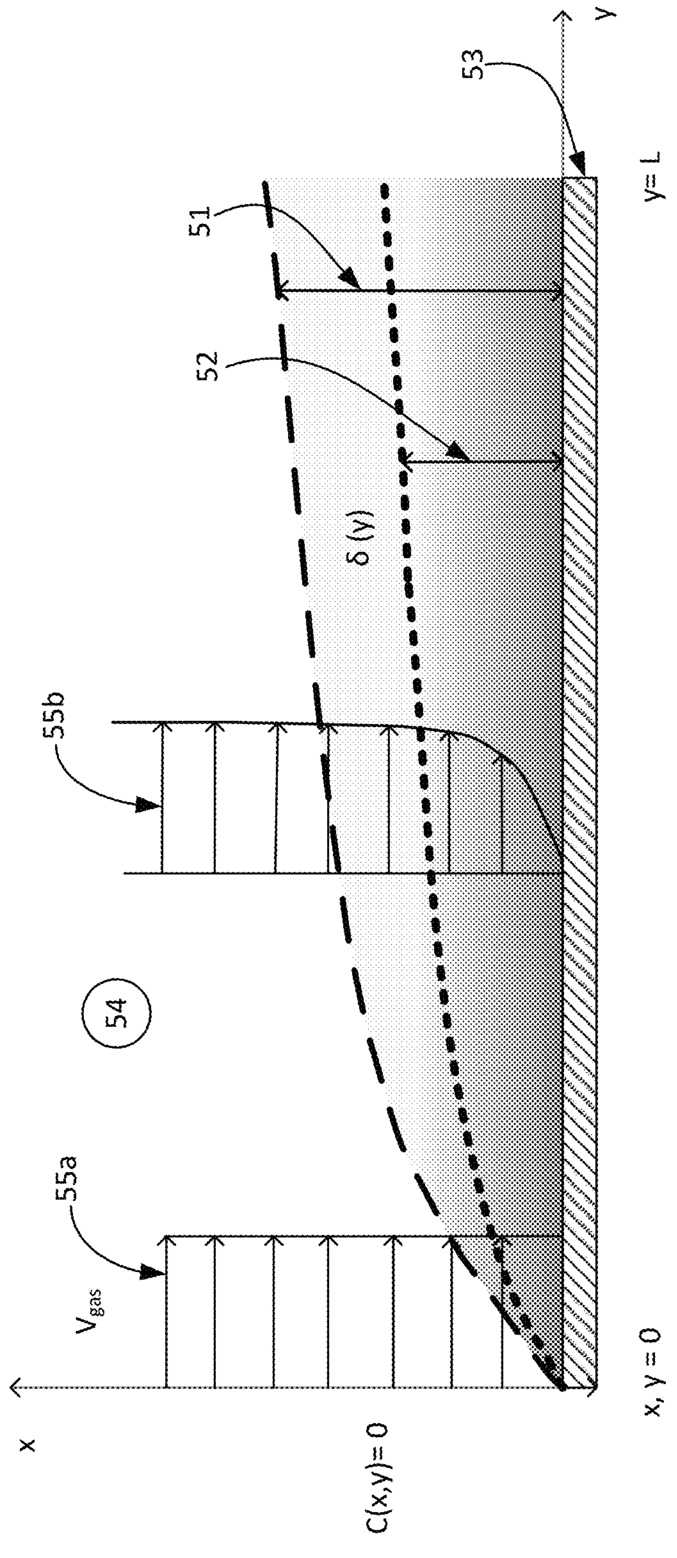
FIG. 5 is a diagram illustrating diffusion and boundary layers for deposited ink and gas flow.

Diagram of FIG. 5 illustrates diffusion and speed boundary layers for hydrodynamic and diffusion layers. Here, 51 designates the hydrodynamic layer, 52 the diffusion layer, 53 the solvent concentration Co at liquid surface, and 54 the solvent concentration outside diffusion layers. $V_{gas}$ is the ambient gas velocity and L is the length of the deposited liquid ink. Gas flow directions is from left to right represented by arrows 55*a* and 55*b*. It is evident from the diagram that the gas stream 55*b* has increasing velocity rate with a distance substantially normal to the direction of the gas flow and is maximized over the surface of the deposited ink.

According to a coarse model, this mechanism is described driven by the Fick’s law. Shortly, Fick’s Law describes the relationship between the rate of diffusion and the factors that affect diffusion. It states that the rate of diffusion is proportional to both the surface area and concentration difference and is inversely proportional to the thickness of the diffusion layer. The flux of solvent ($J_m$) is given by equation [1] as function of thickness x and time t:

$$J_m(x,t) = D\frac{\partial C(x,t)}{\partial x} = D\frac{C_o}{X} \qquad [1]$$

Considering the ambient gas is moving, the hydrodynamic layer thickness is given by equation [2]:

$$\delta(y) = \sqrt{\frac{v}{V_{gas}} y} \quad [2]$$

Wherein ν is the kinetic viscosity of the gas and D is Diffusion coefficient of the solvent within the gas. By identification, it is understood that x is the thickness δ(y), and by combining equations [1] and [2], equation [3] is obtained:

$$J_m(V_{air}) = DC_o\sqrt{\frac{V_{gas}}{vy}} \quad [3]$$

Thus, one conclusion is that the solvent flux, i.e., drying time is dramatically enhanced by elaborating with parameters:

Gas velocity;

Temperature as D is function of the air (gas) temperature;

Existence of a leading edge (gas flow impingement) to maximize gas velocity in the vicinity of liquid surface.

The gas stream may be generated and directed using the nozzle and especially the nozzle head. FIG. 6 to FIG. 9 each illustrate one exemplary cross-sectional side view of a nozzle head, i.e., the exhaust portion of the nozzle. As mentioned earlier, a nozzle may comprise a housing and a gas injection channel having a width extending at least over the entire substrate. However, a nozzle may comprise one or several smaller tubular or cylindrical bodies having a gas injection channels. In one embodiment, e.g., with a mobile print head, the nozzle and the substrate can be arranged displaceable with respect to each other.

Figure 6:
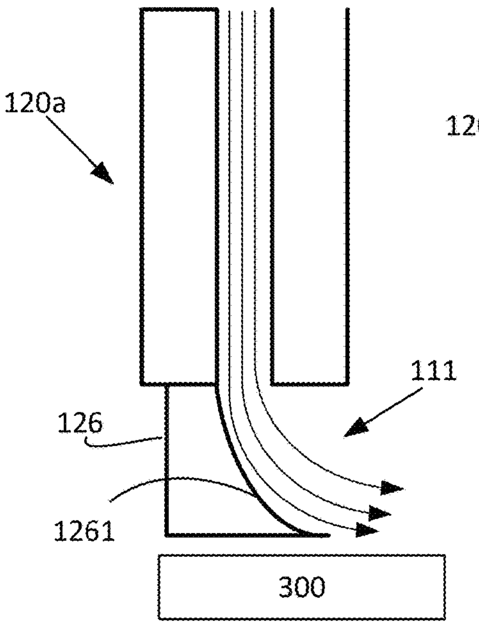
FIGS. 6 to 9 illustrate various schematic embodiments of nozzle heads.

FIG. 6 illustrates schematics of a first nozzle head 120*a* in accordance with one embodiment of the invention. The nozzle exhaust portion comprises a guiding portion 126 provided with a guiding surface 1261, which forces the gas stream 111 to change direction parallel to the surface of the substrate 300.

Figure 7:
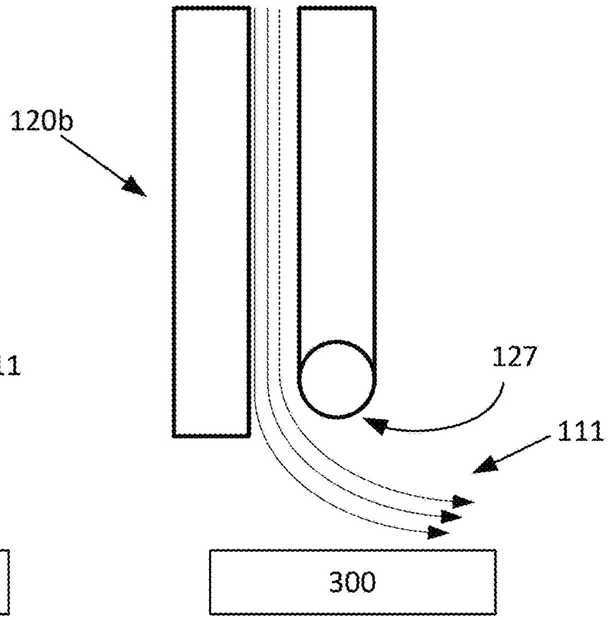

FIG. 7 illustrates schematically a second nozzle head 120*b* in accordance with another embodiment of the invention. The nozzle exhaust portion comprises a Coanda surface 127, which due to Coanda effect forces the gas stream 111 to change direction substantially parallel to the surface of the substrate. The Coanda effect is an aerodynamic phenomenon, according to which a gas/fluid when propelled at the right speed and pressure, naturally follows an adjacent surface.

Figure 8:
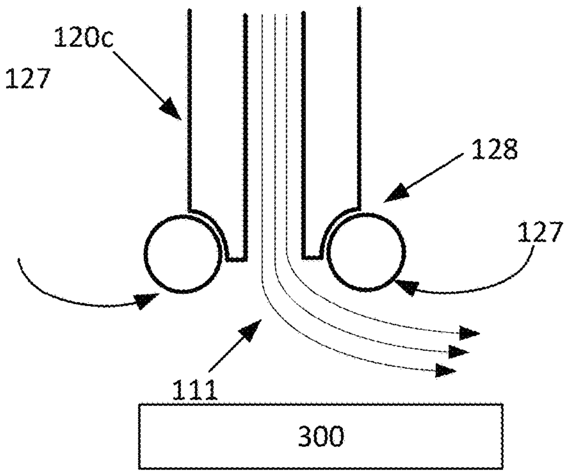

FIG. 8 illustrates schematically a third nozzle head 120*c*. The nozzle exhaust portion comprises two Coanda surfaces 127, and control gas jet channels 128. When a gas jet is introduced in the channel 128 the gas stream 111 is directed due to Coanda effect, which forces the gas stream 111 to change direction substantially parallel to the surface of the substrate 300.

Figure 9:
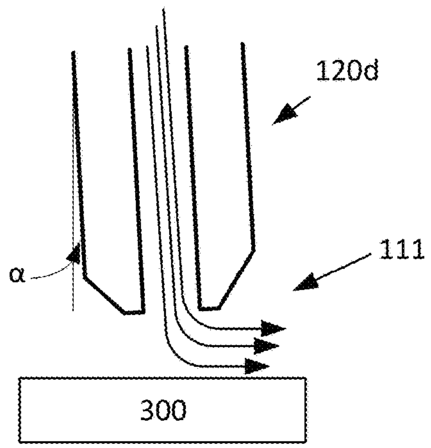

FIG. 9 illustrates schematically a fourth nozzle head 120*d*. The entire nozzle or the nozzle exhaust portion is tilted slightly. A gas stream 111 forced out of the nozzle impinges the surface of the substrate and changes direction substantially parallel to the surface of the substrate 300.

Figure 10:
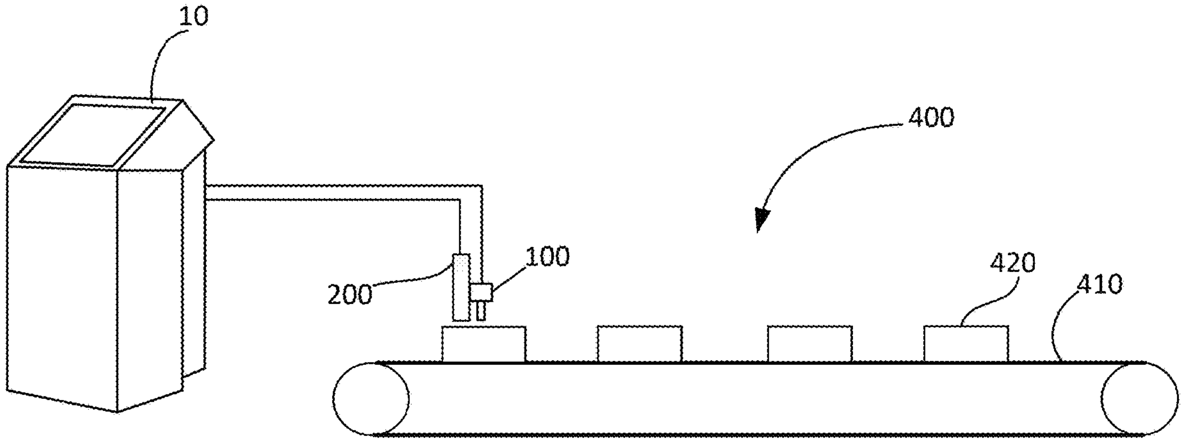
FIG. 10 is an exemplary production line, in which methods and systems described herein may be implemented.

FIG. 10 is another embodiment of the present invention, in which a dryer device 100 is arranged outside the printer 10 housing but close to a print head unit 200 along the production line 400. The production line according to this example comprises a continuous belt 410 transporting goods 420 to be provided with marks. This embodiment implies that the dryer arrangement can be arranged in a position it is needed.

Figure 11:
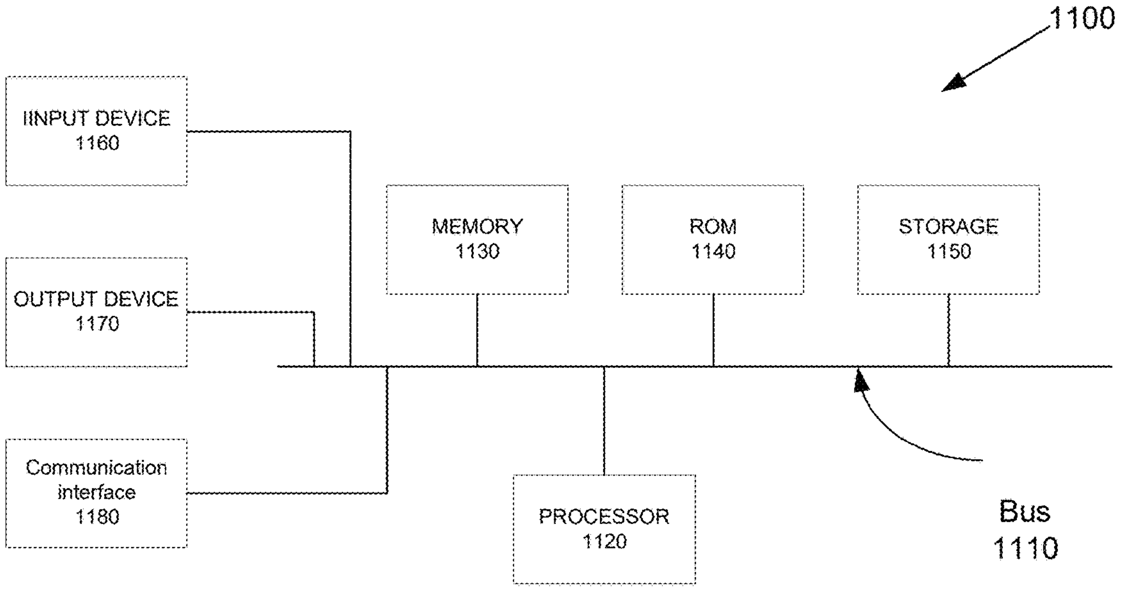
FIG. 11 illustrates schematically a controller according to one embodiment of the present invention.

FIG. 11 is a diagram of an exemplary controller 1100 for controlling a dryer arrangement according to the present invention as described in various embodiments. The controller 1100 may include a bus 1110, a processor 1120, a memory 1130, a read only memory (ROM) 1140, a storage device 1150, an input device 1160, an output device 1170, and a communication interface 1180. Bus 1110 permits communication among the components of controller 1100. Controller 1100 may also include one or more power supplies (not shown). One skilled in the art would recognize that controller 1100 may be configured in a number of other ways and may include other or different elements.

Processor 1120 may include any type of processor or microprocessor that interprets and executes instructions. Memory 1130 may include a random-access memory (RAM) or another dynamic storage device that stores information and instructions for execution by processor 1120. Memory 1130 may also be used to store temporary variables or other intermediate information during execution of instructions by processor 1120.

ROM 1140 may include a conventional ROM device and/or another static storage device that stores static information and instructions for processor 1120. Storage device 1150 may include a magnetic disk or optical disk and its corresponding drive and/or some other type of magnetic or optical recording medium and its corresponding drive for storing information and instructions. Storage device 1150 may also include a flash memory (e.g., an electrically erasable programmable read only memory (EEPROM)) device for storing information and instructions.

Input device 1160 may include one or more conventional mechanisms that permit a user or other computer unit to input information to the controller 1100, such as a keyboard, a keypad, a directional pad, a mouse, a pen, voice recognition, a touchscreen and/or biometric mechanisms, computer interface, etc. Output device 1170 may include one or more conventional mechanisms that output information to the user, including a display, a printer, one or more speakers, etc. The communication interface 1180 may include any transceiver-like mechanism that enables controller 1100 to communicate with other devices and/or controllers. For example, communication interface 1180 may include a modem or an Ethernet interface to a LAN. Alternatively, or additionally, communication interface 1180 may include other mechanisms for communicating via a network, such as a wireless network. For example, communication interface may include a radio frequency (RF) transmitter and receiver and one or more antennas for transmitting and receiving RF data.

The controller 1100, consistent with the invention, provides a platform through which a dryer arrangement as described can be controlled and tuned and which provides feedback to an operator by displaying information associated with the dryer. According to an exemplary implementation, controller 1100 may perform various processes in response to processor 1120 executing sequences of instructions contained in memory 1130. Such instructions may be read into memory 1130 from another computer-readable medium, such as storage device 1150, or from a separate device via communication interface 1180. It should be understood that a computer-readable medium may include one or more memory devices or carrier waves. Execution of the sequences of instructions contained in memory 1130 causes processor 1120 to perform the acts that will be described hereafter. In alternative embodiments, hard-wired circuitry may be used in place of or in combination with software instructions to implement aspects consistent with the invention. Thus, the invention is not limited to any specific combination of hardware circuitry and software.

Figure 12:
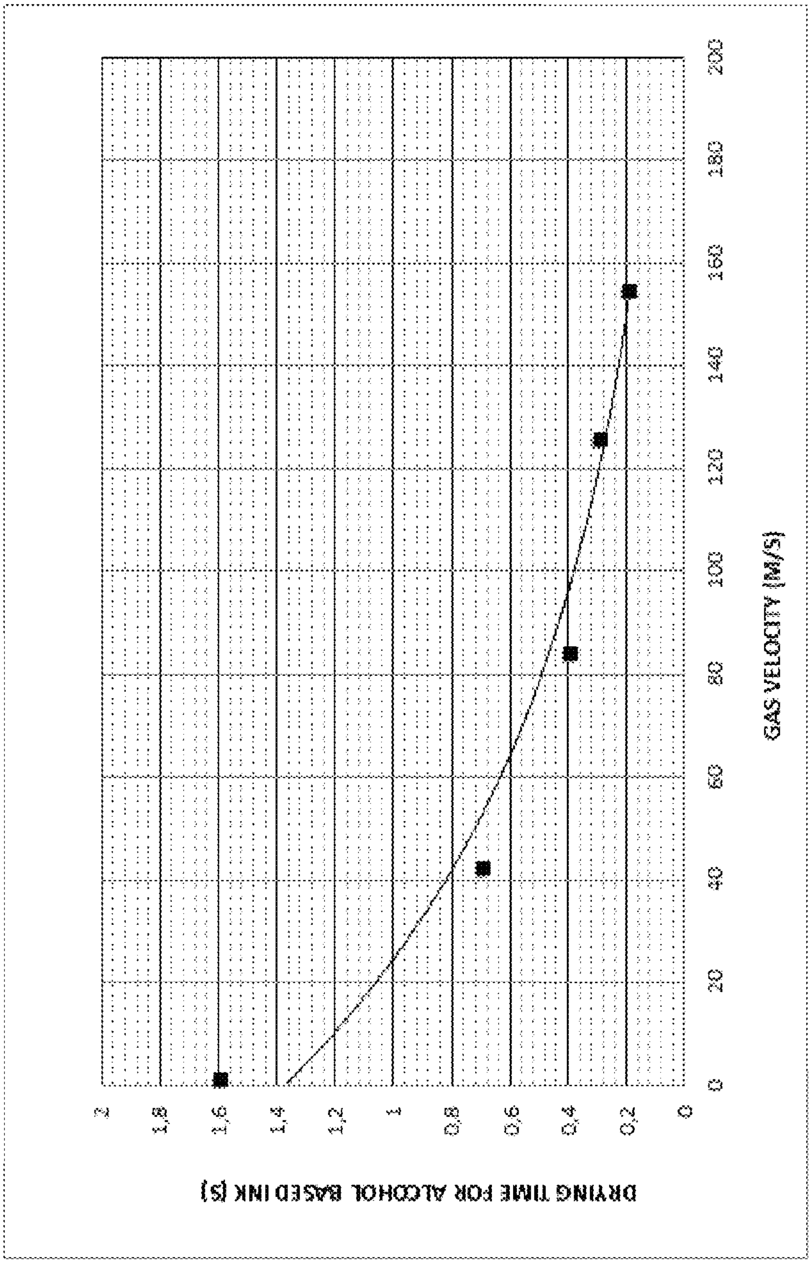
FIG. 12 illustrates an exemplary diagram depicting an experimental curve of drying time as function of air velocity.

FIG. 12 illustrates a diagram showing an experimental curve of drying time as function of the gas velocity. Here 0 m/s of air/gas velocity means no air flow, which corresponds to most important drying time.

This curve is obtained during an experiment with an alcohol-based ink having black dye of viscosity 4 cps. The print pattern consists of a matrix of dots, each dot issued from a liquid drop of 350 pl in volume. The printer used was a commercial CIJ printer "small character range" produced by the applicant.

Clearly, the dryer speeds up the drying process. In this case, the drying time for alcohol solvent is decreased from approx. 1.6 s to 0.2 s at approximately 155 m/s of air flow velocity.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules and systems.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

What is claimed is:

1. A dryer arrangement configured to be arranged downstream of a liquid ink depositing printhead and to speed up drying time for a liquid ink deposited on an area on a surface of a substrate, wherein the arrangement comprises:

at least one nozzle portion configured to emit a pressurized gas stream, the at least one nozzle portion comprising a nozzle head having an orifice through which the gas stream is emitted, the nozzle head configured to emit the gas stream in a direction substantially parallel to the surface of the substrate and in a direction that is the same as the direction of travel of the substrate;

wherein the emitted gas stream is a laminar stream of gas;

wherein the gas stream includes a gas boundary layer adjacent the surface of the substrate at the area and that flows through a dispersion layer of a solvent portion of the liquid ink, the gas boundary layer having a plurality of sublayers in which a difference in respective velocities of adjacent sublayers of the gas boundary layer increases with distance normal to and going away from the surface of the substrate so that the gas boundary layer has a gas velocity gradient with a predetermined thickness over the area and so that an evaporation rate of the solvent portion of the liquid ink is increased.

2. The arrangement of claim 1, wherein parameters of the gas stream are tuned for different solvents based on information about the ink.

3. The arrangement of claim 1, wherein the gas stream has at least one of:

a stream thickness between 50 μm to 500 μm;

a stream velocity between 10 m/s to 150 m/s; or a temperature between 0° C. and 150° C.

4. The arrangement of claim 1, further comprising at least one of:

a gas stream amplifier device in the nozzle head; or a gas inlet connected to a printer housing or an external source.

5. The arrangement of claim 1, the nozzle head comprising at least one Coanda surface configured to change a direction of the gas stream to be substantially parallel to the surface of the substrate.

6. The arrangement of claim 1, wherein the gas stream is controlled by the nozzle head being inclined at an angle range of 70° to 80° with respect to a plane of the substrate.

7. The arrangement of claim 1, further comprising at least one of:

a detection device configured to detect at least one of the substrate, a substrate type, a substrate surface type, or substrate speed;

a unit to receive printer configurations to adopt the gas stream; or a heating element.

8. The arrangement of claim 1, wherein the gas is air.

9. The arrangement of claim 1, wherein the printer is a Continuous Inkjet printer.

10. The arrangement of claim 1, wherein the printer has an ink drop volume of 10 pl to 10000 pl.

11. The arrangement of claim 1, wherein the liquid ink comprises a solvent or a solvent mixture, wherein the solvent or the solvent mixture has a low vapor pressure in a range of 1 mbar to 100 mbar at 25° C.

12. The arrangement according to claim 1, further comprising a purification device configured to purify gas from a gas source.

13. A printer comprising a print head configured to deposit the liquid ink in the form of ink drops onto the substrate and a print controller, the printer comprising the arrangement according to claim 1.

14. The arrangement of claim 1, wherein the gas stream has at least one of:

a stream thickness between 100 μm to 500 μm;

a stream velocity between 80 m/s to 100 m/s; or a temperature between 0° C. and 100° C.

15. The arrangement of claim 1, wherein the gas stream is controlled by a guiding surface of the nozzle head that forces the gas stream to change direction to be substantially parallel the surface of the substrate.

16. A method of evaporating a solvent portion of a liquid ink deposited on an area on a surface of a substrate, the method comprising:

applying pressure to a gas stream;

emitting the controlled gas stream from a nozzle, the gas stream being a laminar stream of gas, the nozzle comprising a nozzle head having an orifice through which the gas stream is emitted, the nozzle head configured to emit the gas stream in a direction substantially parallel to the surface of the substrate and in a direction that is the same as a direction of travel of the substrate;

wherein the gas stream includes a gas boundary layer adjacent the surface of the substrate at the area and that flows through a dispersion layer of a solvent portion of the liquid ink, the gas boundary layer having a plurality of sublayers in which a difference in respective velocities of adjacent sublayers of the gas boundary layer increases with distance normal to and going away from the surface of the substrate so that the gas boundary layer has a gas velocity gradient with a predetermined thickness over the area and so that an evaporation rate of the solvent portion of the liquid ink is increased.

17. The arrangement of claim 1, further comprising:

a controller configured to at least one of:

control a gas flow generating arrangement;

control the heating element;

adjust a response time of the heating element with respect to a speed of the substrate; or control one or several gas stream parameters and tune to the solvent portion to adjust a liquid ink drying time.

18. A dryer arrangement configured to be arranged downstream of a liquid ink depositing printhead and to speed up drying time for a liquid ink deposited on an area on a surface of a substrate, wherein the arrangement comprises:

at least one pressure source configured to generate a pressurized gas stream;

at least one nozzle portion configured to emit the pressurized gas stream, the at least one nozzle portion comprising a nozzle head having an orifice through which the gas stream is emitted, the nozzle head configured to emit the gas stream in a direction substantially parallel to the surface of the substrate and in a direction that is the same as the direction of travel of the substrate;

wherein the emitted gas stream is a laminar stream of gas;

wherein the gas stream includes a gas boundary layer adjacent the surface of the substrate at the area and that flows through a dispersion layer of a solvent portion of the liquid ink, the gas boundary layer having a plurality of sublayers in which a difference in respective velocities of adjacent sublayers of the gas boundary layer increases with distance normal to and going away from the surface of the substrate so that the gas boundary layer has a gas velocity gradient with a predetermined thickness over the area and so that an evaporation rate of the solvent portion of the liquid ink is increased.

* * * * *